Figure 1:
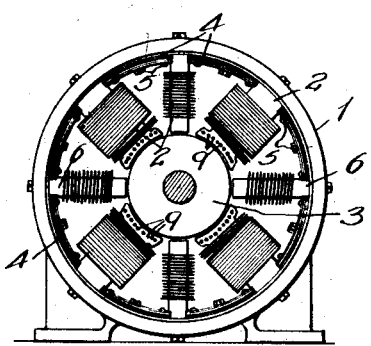

Oct. 16, 1923.

H. H. WAIT 1,470,786

DYNAMO ELECTRIC MACHINE

Filed Aug. 22, 1917

2 Sheets-Sheet 1

Inventor:
Henry H. Wait
by G. L. Cragg

Oct. 16, 1923.

H. H. WAIT

DYNAMO ELECTRIC MACHINE

Filed Aug. 22, 1917

1,470,786

2 Sheets-Sheet 2

Inventor.
Henry H. Wait
By G. K. Gragg Atty.

Patented Oct. 16, 1923.

1,470,786

UNITED STATES PATENT OFFICE.

HENRY H. WAIT, OF CHICAGO, ILLINOIS, ASSIGNOR TO THE WESTINGHOUSE ELECTRIC AND MANUFACTURING COMPANY, A CORPORATION OF PENNSYLVANIA.

DYNAMO-ELECTRIC MACHINE.

Application filed August 22, 1917. Serial No. 187,647.

*To all whom it may concern:*

Be it known that I, HENRY H. WAIT, a citizen of the United States, residing at Chicago, in the county of Cook and State of Illinois, have invented a certain new and useful Improvement in Dynamo-Electric Machines, of which the following is a full, clear, concise, and exact description.

My invention relates to dynamo electric machines and has a number of objects and advantages in view.

By means of one feature of my invention, magnetic and electrical stability of the dynamo electric machine is effectively maintained. By means of another feature of my invention the dynamo electric machine may have fluctuating load without material fluctuation in voltage, or whereby the voltage may be suitably modified when modification is requisite. Furthermore, by means of my invention, the cost of construction is lessened.

My invention is of particular importance when employed in connection with electric generators, but is not to be limited to such dynamo electric machines. By means of my invention a generator, including the various characteristics of my invention, may be adapted to impress substantially constant voltage upon its mains while supporting current to a violently fluctuating load. A generator may be constructed in accordance with my invention that is especially adaptable for use when directly driven by steam turbines or other high speed prime movers, the invention being of particular service when such generators have relatively low resistance main windings. The magnetic flux of a generator of my invention will respond instantaneously to the altered conditions made necessary by the violent fluctuation in load. The magnetic circuit system in my improved generator may have its magnetic resistance reduced, while at the same time the requisite electrical and magnetic stability is maintained.

This feature of the invention is of importance in connection with turbo-generators that run at high speed and in which the inductors of the armature winding have such high velocity that only a comparatively few are required to generate ordinary working voltages. Because of these factors, the general dimensions of the generator and the lengths of the various windings are comparatively small, on which account the various windings that carry the main current are of relatively very low resistance. There is thus very little dead resistance to steady the action of the generator, which said action is of especial importance when the generator is run in parallel with other generators. I compensate for this drawback, due to the absence of sufficient dead resistance, by providing constrictions or necks in the region of the pole faces, a result which is desirably accomplished by forming holes in the poles adjacent, but not extending to, their faces and parallel with the axis of the machine.

Hitherto stability was obtained by making the magnetic circuit of the fields or armature of a generally high degree of saturation, which method would be disadvantageous from the standpoint of a highly fluctuating load. This stability was also obtained by the expensive method of separate excitation. Stability was also obtained by using a high degree of saturation in the armature teeth, but on very high speed generators the frequency of the fluctuations in the magnetic flux through the armature teeth is so high that it would be necessary to make the flux of fairly low density in order to prevent overheating due to hysteresis and eddy currents.

In the construction of my invention, the necks which I provide at the pole faces are highly saturated for a limited distance and thereby afford the requisite stability without causing material loss due to eddy currents and hysteresis.

Where one generator is required to impress a substantially constant voltage while supplying current to a violently fluctuating load, such as a number of electric elevators and tungsten lamps on the same circuit, the load may jump up as much as four to one almost instantaneously. This violent increase in load will tend to slow down the prime mover that drives the generator, causing more than a corresponding decrease in voltage due to this decrease in speed. There would also be a voltage drop in the resistance of the armature windings and other windings in series therewith, as well as in the feeders, etc., and these drops in voltage are compensated for by an increase in magnetic flux produced by series windings on the field poles.

If this increase in magnetic flux is attempted in the main unlaminated portion of the field, eddy currents would be produced in such unlaminated portion which would have the effect of holding back the compensating increase in flux that is needed to maintain the voltage.

In accordance with my invention, I dispose laminæ of sheet iron or steel of suitable grade, between adjacent pole pieces, that project from the unlaminated portion of the field core structure, the laminæ between each two adjacent poles constituting a magnetic shunt for the unlaminated portion (or part of such portion) of the field between these poles. This magnetic shunt will serve to afford the passage for the desired increment in the magnetic flux that will flow in such shunt without the production of the objectionable eddy currents and the attendant retardation producible thereby.

In practicing my invention I prefer to employ such magnetic shunt in each interpolar space, but I do not wish to be limited to this arrangement. I also desirably carry the ends of the magnetic shunts close to the poles, but I do not wish to be limited to this arrangement, particularly as it is sometimes desirable to increase the reluctance between the shunts and the poles where the shunts are made of iron of high permeability, or where the density in the shunts is to be kept low during periods when the load does not materially fluctuate.

While these shunts of my invention are of particular service in maintaining voltage substantially constant while the load may violently fluctuate, it is obvious that such shunts may be of service in modifying the impressed voltage, as, for example, where it is desired to have a considerable over-compounding, with a gradual rise in voltage proportional to load increase.

The accompanying drawings illustrate two ways of practicing my invention. In the drawings—

Figure 2:
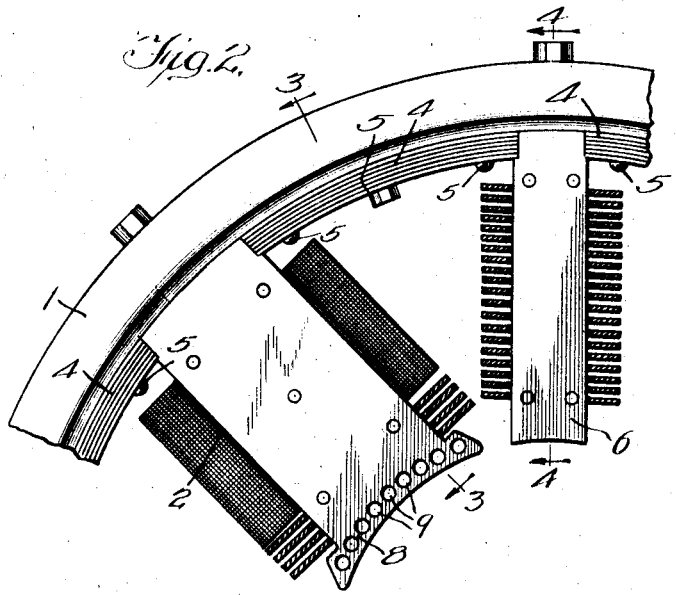
Figure 3:
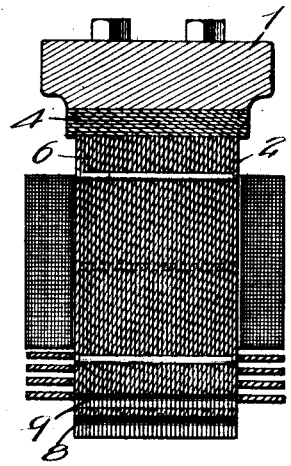
Figure 4:
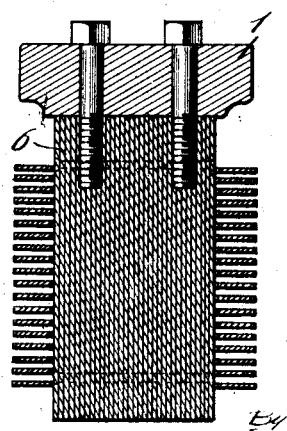
Figure 5:
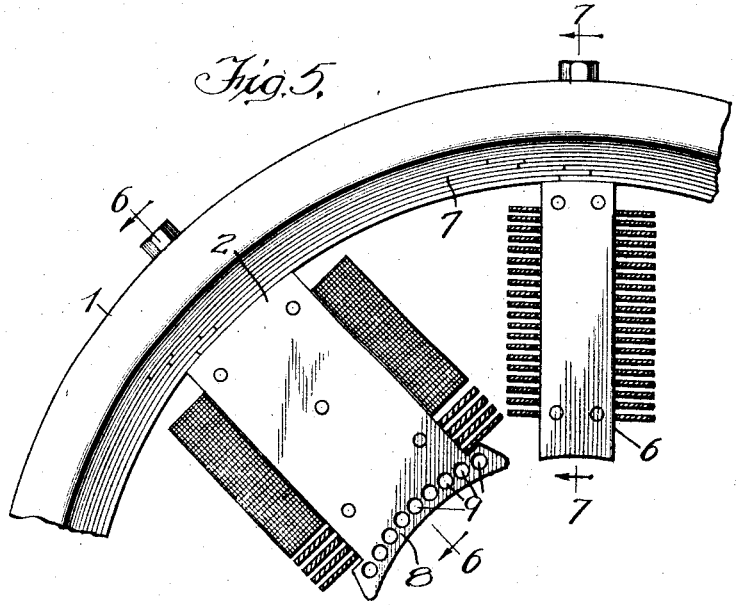
Figure 6:
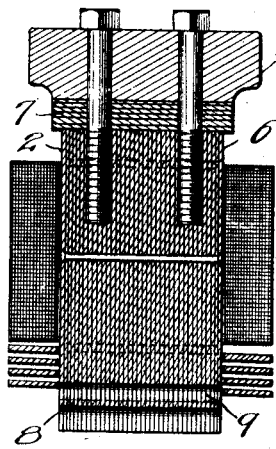
Figure 7:
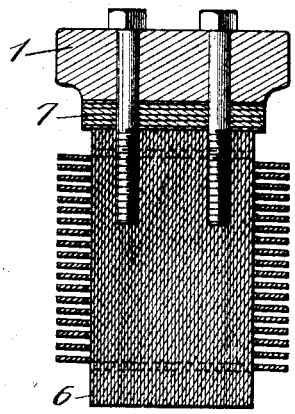

Fig. 1 is an end view of a generator constructed in accordance with the invention, Fig. 2 is a detailed view of the structure shown in Fig. 1, some parts being shown in section, Fig. 3 is a view on line 3—3 of Fig. 2, Fig. 4 is a view on line 4—4 of Fig. 2, Fig. 5 illustrates a modification of the structure shown in Fig. 2, Fig. 6 is a view on line 6—6 of Fig. 5, and Fig. 7 is a view on line 7—7 of Fig. 5.

Like parts are indicated by similar characters of reference throughout the figures.

In the generator illustrated, the field core is stationary and comprises an unlaminated ring 1 of cast iron or cast steel, to which are secured inwardly projecting, radially disposed pole pieces 2 that are desirably formed of laminæ arranged in the plane of rotation of the armature 3.

The magnetic shunts of my invention which I have hitherto described, are illustrated at 4, in Fig. 2, which illustrates the preferred form of the invention, and are attached to the ring 1 by bolts or screws 5. These laminæ are illustrated as projecting close to the radial pole pieces 6 and serve to shunt the part of the unlaminated field portion 1 engaged thereby, with the results which have been fully set forth.

As hitherto set forth, there is desirably one such shunt in each interpolar space. In the construction shown in Fig. 5, a complete ring 7 of laminæ is surrounded by and engages the field ring 1 and constitutes a part thereof. In the construction shown in Fig. 5, the radial commutating pole pieces 6 project directly from the laminated ring 7 instead of being directly engaged with the unlaminated ring 1 as illustrated in Fig. 2.

The dynamo electric machine thus includes laminated pole pieces, laminated iron in complete magnetic circuit with said pole pieces, and unlaminated iron also in complete magnetic circuit with said pole pieces and with which said laminated iron is in shunt relation.

The necks which I provide in certain of the pole pieces are not included in the smaller poles, which are the commutator poles, but are provided in the larger or main poles, as indicated at 8. These necks are formed by means of perforations 9 in the laminæ of the larger poles. These perforations are desirably aligned so that iron rods may be inserted into the larger poles for the purpose of regulating the extent to which the saturation effect may be carried. The holes 9 do not extend to the faces of the poles, whereby such faces are maintained intact. However, the holes 9 are desirably located outside of the winding space on the pole to render them accessible without dismantling the machine. The necks 8 are highly saturated for a limited distance and thereby afford a requisite electrical and magnetic stability without causing material loss due to eddy currents and hysteresis. These short, highly saturated necks operate on the comparatively straight portion of the saturated curve of the iron above the knee, which occurs in such curves, the remaining portion of the magnetic circuit being operated on the comparatively straight low density portion of the magnetic curve. It will be seen that this combination gives the requisite electrical and magnetic stability to the generator while the elements are operating on straight portions of the curve, making the increases in flux called for by the series windings almost directly proportional to the current.

While I have herein shown and particularly described the preferred embodiment of my invention, I do not wish to be limited to the precise details of construction shown as changes may readily be made without departing from the spirit of my invention, but having thus described my invention I claim as new and desire to secure by Letters Patent the following:—

1. In a dynamo-electric machine, a field structure including laminated polar projections, a magnetic yoke therefor comprising an interpolar path of solid material and a shunting interpolar path of laminated material, means for variably exciting certain of said polar projections, and means for producing a core section of relatively high saturation adjacent to, but separated from, the faces of the same polar projections.

2. In a dynamo-electric machine, a field structure including laminated main and commutating polar projections, a magnetic yoke therefor comprising an interpolar path of solid material and a shunting interpolar path of laminated material, means for variably exciting said polar projections, and means for producing a core section of relatively high saturation adjacent to, but separated from, the faces of the main polar projections.

In witness whereof, I have hereunto subscribed my name this 18th day of August A. D., 1917.

HENRY H. WAIT.